United States Patent
Garg

(10) Patent No.: US 9,529,815 B1
(45) Date of Patent: Dec. 27, 2016

(54) SYSTEM AND METHOD TO INTEGRATE BACKUP AND COMPLIANCE SYSTEMS

(71) Applicant: Symantec Corporation, Mountain View, CA (US)

(72) Inventor: Arun Garg, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 346 days.

(21) Appl. No.: 14/046,570

(22) Filed: Oct. 4, 2013

(51) Int. Cl.
*G06F 17/30* (2006.01)

(52) U.S. Cl.
CPC ................. *G06F 17/30144* (2013.01)

(58) Field of Classification Search
CPC ................................ G06F 17/30144
USPC .............................................. 707/690
See application file for complete search history.

(56) References Cited

U.S. PATENT DOCUMENTS

| | | | | |
|---|---|---|---|---|
| 7,167,844 B1 * | 1/2007 | Leong | ............. | G06Q 30/04 705/37 |
| 8,082,337 B1 * | 12/2011 | Davis | ............. | H04L 41/0893 709/223 |
| 8,639,593 B1 * | 1/2014 | Gallagher | ............. | G06Q 40/02 705/30 |
| 2004/0255147 A1 * | 12/2004 | Peled | ............. | G06F 21/10 726/7 |
| 2007/0143851 A1 * | 6/2007 | Nicodemus | ............. | G06F 21/55 726/25 |
| 2007/0244913 A1 * | 10/2007 | Hayhow | ............. | G06F 17/30569 707/999.101 |
| 2008/0082377 A1 * | 4/2008 | Kennis | ............. | G06F 17/30569 705/7.11 |
| 2009/0260051 A1 * | 10/2009 | Igakura | ............. | G06F 9/4825 726/1 |
| 2012/0072985 A1 * | 3/2012 | Davne | ............. | H04L 63/0272 726/22 |
| 2012/0089572 A1 * | 4/2012 | Raichstein | ............. | G06F 11/1461 707/645 |
| 2013/0212278 A1 * | 8/2013 | Marshall | ............. | H04L 47/70 709/226 |
| 2013/0238575 A1 * | 9/2013 | Amarendran | ............. | G06F 17/30221 707/694 |
| 2014/0074793 A1 * | 3/2014 | Doering | ............. | G06F 17/30194 707/667 |

\* cited by examiner

*Primary Examiner* — Rehana Perveen
*Assistant Examiner* — Tiffany Thuy Bui
(74) *Attorney, Agent, or Firm* — Womble Carlyle Sandridge & Rice LLP

(57) ABSTRACT

A method and system for validating data in a data backup system is provided. The method includes receiving, from a compliance system, compliance and internal standards information. The method includes storing the received compliance and internal standards information. The method includes monitoring one or more events. The method includes collecting data associated with the monitored one or more events. The method includes determining whether the collected data deviates from the compliance and internal standards information. The method includes sending a notification, warning, alert and/or other message with in backup system as well as to compliance system in case of deviation from the compliance and internal standards.

17 Claims, 4 Drawing Sheets

SYSTEM AND METHOD TO INTEGRATE BACKUP AND COMPLIANCE SYSTEMS

BACKGROUND

Enterprises of varying sizes retain data related to customers and/or employees. These organizations typically have to follow state/country laws or standards pertaining to data retention, RPO (Recovery Point Objective), RTO (Recovery Time Objective), privacy, and/or other laws or standards. While these organizations backup the data according to their internal policies, verification that the backup attributes, including policies, is in compliance with these laws or internal standards is a manual effort. That is, the administrator or some other designee must manually check for compliance with the laws, standards, or regulations governing aspects of the data collection as no mechanism exists to allow the organizations to provide their compliance and internal standard needs as input and to receive a notification in case these needs are unmet.

It is within this context that the embodiments arise.

SUMMARY

In some embodiments, a method for validating data in a data backup system is provided. The method includes receiving, from a compliance system, compliance and internal standards information. The method includes storing the received compliance and internal standards information. The method includes monitoring one or more events. The method includes collecting data associated with the monitored one or more events. The method includes determining whether the collected data deviates from the compliance and internal standards information. The method includes sending a notification, warning, alert and/or other message with in backup system as well as to compliance system in case of deviation from the compliance and internal standards.

In some embodiments, a data backup system is provided. The data backup system includes a backup server coupled to a memory, the memory configured to store compliance and internal standards information received from a compliance system. The backup server includes a data validator that is configured to: monitor one or more events; collect data associated with the monitored one or more events; and determine whether the collected data deviates from the compliance and internal standards information. In some embodiments, the data validator is configured to send a notification, warning, alert and/or other message within the backup system to the compliance system in case of deviation from the compliance and internal standards.

In some embodiments, a non-transient, tangible, computer-readable media having instructions thereupon is provided. The computer readable media, when executed by a processor, causes the processor to: receive, from a compliance system, compliance and internal standards information; store the received compliance and internal standards information; monitor one or more events; collect data associated with the monitored one or more events; and determine whether the collected data deviates from the compliance and internal standards information. In some embodiments, the processor is configured to send a notification, warning, alert and/or other message within the backup system to the compliance system in case of deviation from the compliance and internal standards.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A data backup system and related method perform data validation to ensure that compliance needs and/or internal standards of an organization are met. The data backup system may receive input regarding compliance and/or internal standards from a compliance system and may store the received input. The data backup system may monitor one or more events and may collect data associated with the one or more events. In response to one or more events, the data backup system may determine whether the collected data is in compliance with the previously received input from the compliance system. In response to a determination that the collected data deviates from the compliance/internal standards, the data backup system may provide a notification, warning, alert and/or other message so that an administrator or other designee is made aware of the deviation. Further details including job settings, device settings, catalog-related checks, etc. are provided below in the description of the Figures and with reference to the examples discussed herein.

Figure 1:
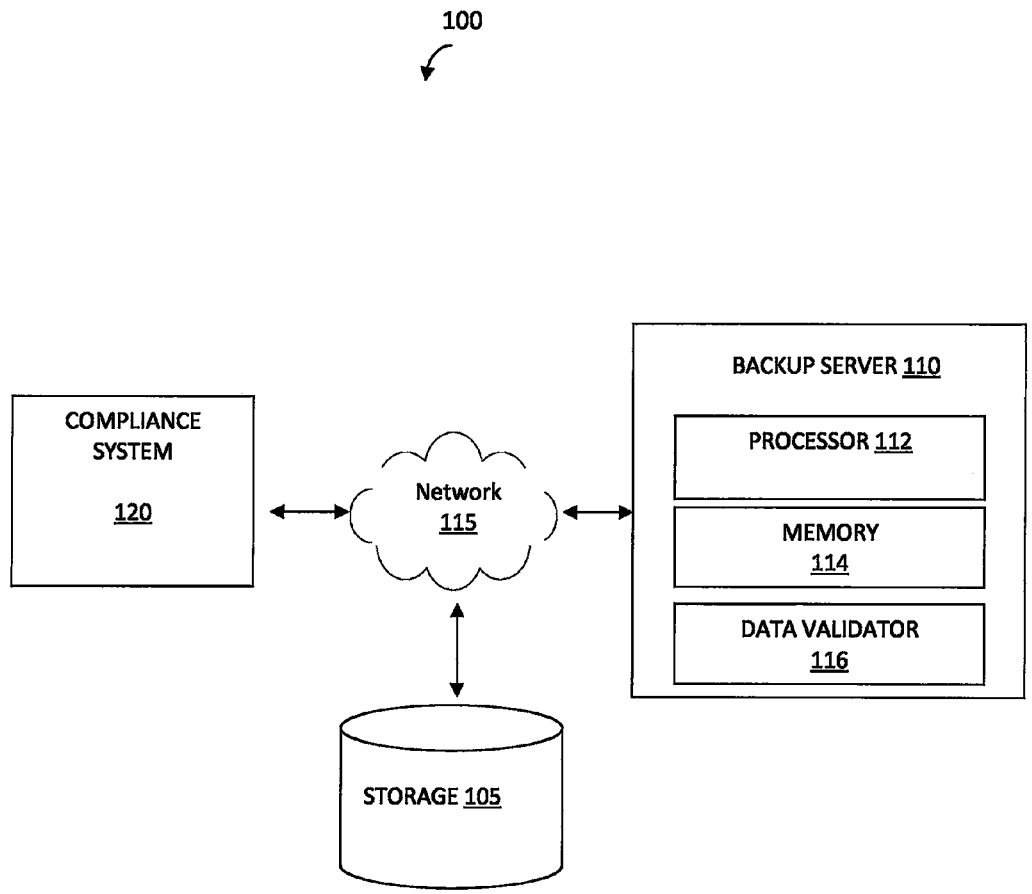
FIG. 1 is a schematic diagram of a data backup system including a data validator, according to various embodiments of the invention.

FIG. 1 shows a data backup system 100 including backup server 110 that performs backups for one or more client computing devices (not otherwise illustrated in FIG. 1). Backup data is stored in one or more storage devices 105. Backup server 110 may be communicably coupled to the compliance system 120 and storage device(s) 105 via network 115. Network 115 may include any one or more of, for instance, the Internet, an intranet, a LAN (local area network), a WAN (Wide area network), a storage area network, a MAN (metropolitan area network), a wireless communication network, or other network or combination of networks. In some implementations, backup server 110 may be coupled to storage device(s) 105 via another network (not otherwise illustrated in FIG. 1), which may include a storage area network or network attached storage. The above-described networks could be combined, or further networks could be used, etc. Other arrangements and networks for the backup server 110, the client computing devices, the compliance system 120 and the storage device(s) 105 are readily devised.

Backup server 110 may include a processor 112, memory 114, a data validator 116, and/or other components that facilitate the functions of backup server 110/data validator 116. In some implementations, processor 112 includes one or more processors/hardware processors configured to perform various functions of backup server 110. In some implementations, memory 114 includes one or more tangible (i.e., non-transitory) computer readable media. Memory 114 may include one or more instructions that when executed by processor 112 may configure processor 112 to perform functions of backup server 110. In some implementations, memory 114 may include one or more instructions stored on tangible computer readable media that when executed at a remote device (such as, compliance system 120) may cause the remote device to perform various functions of the remote device described herein and to facilitate interaction with backup server 110, as described herein. It should be appreciated that backup server 110 may be embodied as software or firmware, e.g., a combination of software and hardware. In some embodiments the software may any of the commercially available products available from the assignee, such as NETBACKUP™, BACKUP EXEC™, etc., or products from other solution providers, such as COMMVAULT™.

Compliance system 120 is configured to communicate to backup server 110 any compliance and/or internal standards for an organization. Backup server 110 may receive and store the compliance and/or internal standards received from compliance system 120 in memory 114 or storage device(s) 105. In some implementations, storage device(s) 105 may include a database (such as a relational database), a filesystem and/or other device or data representation configured for data storage. In some implementations, compliance system 120 and backup server 110 may be installed and configured at a client site. Compliance system 120 may be embodied as software or firmware, e.g., a combination of software and hardware. In some embodiments, the compliance systems are commercially available systems or customized solutions. Commercially available systems may address compliance with federal or state legislation, such as Health Insurance Portability and Accountability Act, or regulatory rules or standards from agencies, such as the Financial Industry Regulatory Agency, Federal Drug Administration, etc. Customizable systems may be configured to address compliance with federal or state legislation, regulatory agencies or internal organization standards. In some embodiments, compliance system 120 may be provided under a software as a service (SaaS) model, which may be referred to Compliance as a Service (CaaS). Compliance system 120 may be dedicated to a single organization or customer in some embodiments. In alternative embodiments, compliance system 120 may serve multiple customers and is not limited to a single customer. In some implementations, the manufacturer of compliance system 120 is different from and/or independent of the manufacturer of backup server 110. However, this is not meant to be limiting as compliance system 120 and backup server 110 may be from the same manufacturer in other embodiments.

In some implementations, backup server 110 may provide a well-defined format or interface based on which backup server 110 may communicate with compliance system 120 (for example, connect to compliance system 120, receive input from the compliance system 120, and provide output to the compliance system 120). In some implementations, backup server 110 may utilize webservice format, XML format, and/or other formats/interfaces, such as public APIs (application programming interfaces) to communicate with compliance system 120. In one implementation, backup server 110, (e.g., the backup software application) provides a format/interface to allow communication with compliance system 120. In a further implementation, this format/interface is an API. This format/interface allows the compliance system to communicate policies, requirements, and the like, directly with the backup system. It should be appreciated that data validator 116 may be a stand-alone appliance/module that is in communication with backup server 110. In addition, while one backup server 110 is illustrated in FIG. 1, there may be multiple backup servers 110 with each backup server 110 including data validator 116. In another embodiment, when data validator 116 is a stand-alone appliance/module, the data validator can communicate with a single backup server 110 or multiple backup servers.

In some implementations, a webservice or public method (such as XML) may be exposed via backup server 110 indicating the manner or format in which the backup server 110 expects data from or provides data to compliance system 120. Compliance system 120 may invoke/call an appropriate method of the webservice to provide input (i.e., compliance and/or internal standards) to the backup server 110. Similarly, backup server 110 may invoke an appropriate method to receive input from compliance system 120. Also, compliance system 120 may invoke an appropriate method of the webservice to receive output from the backup server 110 and backup server 110 may invoke an appropriate method to provide output to compliance system 120. Examples of methods may include, push method, get method, and/or other methods.

In some implementations, the compliance standards may include standards pertaining to backup or restore, data retention (for example, retention period), RPO (Recovery Point Objective), RTO (Recovery Time Objective), and/or other compliance standards. For example, the compliance standard pertaining to backup or restore may indicate the backup frequency at which backup is to be performed, a number of policies for which backup is to be performed (for example, a compliance standard may indicate that no client backup be performed for more than "x" policies). The compliance standard pertaining to data retention may indicate a retention period for a policy (the retention period is 7 years, for example). The compliance standard pertaining to RPO may indicate that the desired RPO is 2 hours, for example. The compliance standard pertaining to RTO may indicate that the desired RTO is 4 hours, for example.

The internal standards may include standards pertaining to policy or storage naming, encryption, privacy (for example, login access), catalog size, jobs running on system, and/or other internal standards. For example, the internal standard pertaining to policy or storage naming may indicate a particular format in which the policy or storage device is to be named. In some embodiments the internal standards for backup system entities such as a policy naming standard. The internal standard pertaining to encryption may indicate whether data encryption (while backing up data) is required at all times or for a specific client/policy type, etc. The internal standard pertaining to privacy may indicate that when unsuccessful login attempts are to be reported (i.e., provided as output to compliance system 120) and also the parameters (such as, user id, client id, timestamp) to be reported. For example, unsuccessful login attempts are to be reported if login access fails more than "x" times in "x" amount of time. The internal standard pertaining to catalog size may indicate when a particular catalog size is to be reported (for example, when the catalog size reaches "x"% of disk space). The internal standard pertaining to jobs running may indicate when a number and type of jobs running is to be reported (for example, when jobs are running for more than "x" amount of time). In some embodiments, backup server 110 may store the compliance/internal standards information in memory 114 or storage device 105. Backup server 110 may create a table and store the compliance/internal standards information in the table.

Figure 2:
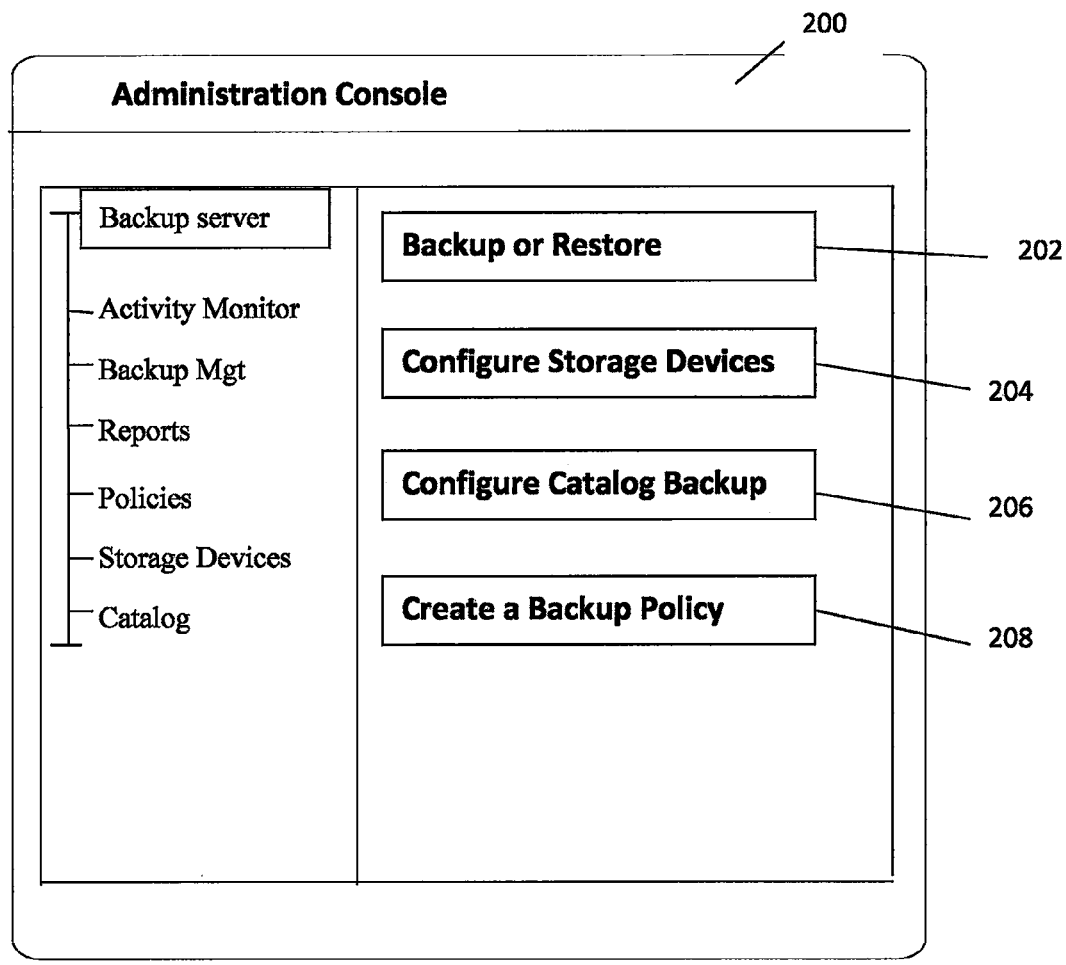
FIG. 2 is an example graphical user interface provided by the data backup system, according to various implementations of the invention.

In some implementations, system administrators (or other authorized users) may interact with the backup server 110 via an administrator or management console 200 (depicted in FIG. 2, for example). In some implementations, backup server 110 may be configured to generate a graphical user interface for the management console 202. Users may perform various activities such as, for example, perform backup/restore (by selecting element 202), configure storage devices (by selecting element 204), configure catalog backup (by selecting element 206), create backup policies (by selecting element 208), and/or other activities. While FIG. 2 depicts elements 202, 204, 206, 208 as graphical buttons which may be selected by user, other forms of graphical elements or icons may be used without departing from the scope of the invention.

Returning to FIG. 1, backup server 110 may monitor one or more events or activities being performed or occurring on the backup server 110. The events/activities may include user events, hardware or system events, and/or other types of events. For example, the events/activities may include, performing backup or restore, creating/saving a policy, logging in to particular backup product, receiving catalog size indication, receiving an indication of an amount of time a job is running (via a timer device, for example), and/or other events/activities.

In some implementations, backup server 110 may collect data associated with the events/activities and provide the collected data to data validator 116. For example, when performing backup or restore, backup server 110 may collect data such as, client id for which the backup is performed, a current policy count indicating the number of policies for which the backup has already been performed, current frequency of backup, and/or other data. When creating/saving a particular policy (for example, a particular backup policy), backup server 110 may collect data such as, the format in which the policy being created has been named, whether encryption has been enabled for this policy, whether duplication has been enabled for this policy, parameters for performing backup, and/or other data. When logging in to a particular backup product (installed on backup server 110, for example), backup server 110 may collect data such as, user id of the user performing the login access, system/client id, a number of times the user has tried to log in within a particular timeframe, and/or other data. When receiving a catalog size indication, backup server 110 may collect data such as, current catalog size, and/or other data. When receiving an indication of an amount of time a job is running, backup server 110 may collect the current amount of time that a particular job is running.

Data validator 116 may determine whether the collected data deviates from the compliance and/or internal standards data received from the compliance system 120. Data validator 116 may make this determination by analyzing and/or comparing the collected data and the previously stored compliance and/or internal standard information. In some implementations, data validator 116 may retrieve compliance and/or internal standard information from the memory 114 or storage device 105 that stores the compliance and/or internal standard information. In some implementations, data validator 116 may query a database (storage device 105) that stores the compliance and/or internal standard information. The lookup may be a structured query language (SQL) query, lightweight directory access protocol (LDAP) query, and/or any other known methods of querying the database.

In response to a determination that the collected data deviates from the compliance and/or internal standards data, backup server 110 may provide feedback to the user in the form of a notification, warning, alert and/or other message to the user (via the console 200, for example). In some implementations, backup server 110 may report the feedback, result (such as compliant or not compliant—the standard(s) for which data is not in compliance) or other associated data to compliance system 120 (by invoking the appropriate method, for example).

In a first example, the backup server 110 may have previously received an input from the compliance system 120 indicating that the desired retention period (i.e., compliance standard) for a policy is 7 years. Thus, for 7 years whenever a policy gets created on disk, it has to be duplicated on tape to be in compliance. Now, when a user tries to create and/or save a backup or restore policy, data validator 116 may determine (based on collected data associated with the creating/saving policy, for example) whether the user is trying to save the policy without duplication on tape. If the user is trying to save the policy without duplication, backup server 110 may determine that the collected data deviates from the desired retention period standard and hence, is not in compliance with the compliance and/or internal standards data. Accordingly, backup server 110 may warn the user that creating/saving such a policy does not meet with the compliance standards and may provide a solution which may result in compliance. For example, backup server 110 may prompt the user to enable duplication of policy, which will result in compliance of the retention period standard.

In a second example, the backup server 110 may have previously received an input from the compliance system 120 indicating that the desired RTO is 4 hours. Now, when a user tries to create and/or save a backup or restore policy, data validator 116 may determine that the user is backing up in a manner that does not allow an RTO of 4 hours. Thus, backup server 110 may make a determination that the collected data (i.e., data collected for create/save policy event) deviates from the desired RTO and hence, deviates from the compliance and/or internal standards data. Accordingly, backup server 110 may warn the user that creating/saving such a policy does not meet with the compliance standards and may provide a backup solution which may result in compliance. For example, backup server 110 may provide an alternate/different backup policy which will result in compliance with the RTO standard. In some implementations, the backup server 110 may analyze the backup/restore system environment of the client (for example, types of storage devices used, number of storage devices, etc.) and may configure or generate the alternate backup policy that complies with the RTO standard while taking the client environment into account.

In a third example, the backup server 110 may have previously received an input from the compliance system 120 indicating that the policy be named in a particular format (such as, for example, the policy name should be in the format hostname-client name-policy name). Now, when a user tries to create and/or save a policy, data validator 116 may determine that the user is trying save a policy which is not named correctly. Thus, backup server 110 may make a determination that the collected data (i.e., data collected for create/save policy event) deviates from the desired name format and hence, is not in compliance with the compliance and/or internal standards data. Accordingly, backup server 110 may warn the user that creating/saving such a policy does not meet with the compliance standards and may provide a message to the user indicating/displaying the desired format such that the user may name the policy in the desired format (which would result in compliance). In some implementations, backup server 110 may auto-populate based on the standard so that when creating the policy, the user automatically creates it in the desired format.

In a fourth example, the backup server 110 may have previously received an input from the compliance system 120 indicating that encryption is required (when backing up data) at all times or for a specific client or policy type. Now, when a user tries to perform backup or create a policy for performing backup, data validator 116 may determine that the user is trying to perform the backup for the specific client or policy type but without encryption. Thus, backup server 110 may make a determination that the collected data (i.e., data collected for performing backup event) deviates from the desired encryption requirement and hence, is not in compliance with the compliance and/or internal standards data. Accordingly, backup server 110 may warn the user that performing such backup does not meet with the compliance standards and may provide a message to the user indicating that encryption needs to be enabled for backup (which would result in compliance). In some implementations, backup server 110 may prompt the user to enable encryption (or in some cases, may allow the user to make a decision regarding whether the user wants to encrypt or not). In some implementations, backup server 110 may automatically encrypt without prompting the user.

In a fifth example, the backup server 110 may have previously received an input from the compliance system 120 indicating that unsuccessful login attempts (for example, if login to a particular backup product fails more than 2 times in 1 minute) be reported to the user and the compliance system 120. Now, when a user tries to login, data validator 116 may determine whether the user has failed to login twice in a 1 minute time frame. If so, backup server 110 may determine that collected data (i.e., data collected for login event) deviates from the privacy standard (i.e., is not in compliance with the compliance and/or internal standards information). Accordingly, backup server 110 may warn the user that 2 attempts have already been made. In some implementations, backup server 110 may report the user id, the client id, and login times (i.e. timestamps) to the compliance system 120.

In a sixth example, backup server 110 may have previously received an input from the compliance system 120 indicating that catalog size not to increase beyond 80% of disk space and the catalog size be reported to the user and the compliance system 120 if it does. Now, as the catalog size keeps on growing, backup server 110/data validator 116 receives indications regarding changing catalog size. When the catalog size reaches above 80% of disk space (for example, 90%), backup server 110 may determine that collected data (i.e., data collected for catalog size event) deviates from the standard (i.e., is not in compliance with the compliance and/or internal standards information). Accordingly, backup server 110 may warn the user that catalog size has increased beyond 80%. In some implementations, backup server 110 may report the catalog id, and size to the compliance system 120.

In a seventh example, the backup server 110 may have previously received an input from the compliance system 120 indicating that no backup be performed for more than 100 policies. Now, when a user tries to perform backup, data validator 116 may determine whether the backup is being performed for policy count 101. If so, the backup server 110 may make a determination that the collected data (i.e., data collected for performing backup event) deviates from the desired backup requirement and hence, is not in compliance with the compliance and/or internal standards data. Accordingly, backup server 110 may warn the user that performing such backup does not meet with the compliance standards and may provide a message to the user indicating that no more backups may be performed. In some implementations, backup server 110 may prompt the make a decision regarding whether he wants to backup or not).

In an eighth example, backup server 110 may have previously received an input from the compliance system 120 indicating that no jobs are run for more than 10 hours and that jobs running for more than 10 hours be reported to the user and the compliance system 120. Now, when an indication is received that a particular job has been running for more than 10 hours, backup server 110/data validator 116 may determine that collected data (i.e., data collected for jobs running event) deviates from the standard (i.e., is not in compliance with the compliance and/or internal standards information). Accordingly, backup server 110 may warn the user that a job has been running for more than 10 hours. In some implementations, backup server 110 may report the job id, and the amount of time the job has been running to the compliance system 120.

In a ninth example, backup server 110 may have previously received an input from the compliance system 120 indicating an error code to be reported to the user and the compliance system 120. For example, in the instance where a backup fails with a "storage unit full error," an alert and the compliance system 120 can generate a ticket or provide some other mechanism to rectify the issue.

In a tenth example, backup server 110 may receive an input from the compliance system 120 for a company or organization specific privacy message to be shown on a login screen or in a pop-up window for login. The privacy message may appear in different screens of the graphical user interfaces for the backup software in some embodiments.

The scenarios described above are mere examples, and do not limit the types or number of compliance and/or internal standards provided to backup server 110, of events/activities monitored by backup server 110, messages or solutions provided by backup server 110, and/or output/reports generated for the compliance system 120. Further, any messages, solutions or other feedback provided to the user may be reported to the compliance system 120 without limitation.

It will be appreciated that while FIG. 1 and the associated description depicts and describes a data backup system 100 comprising a compliance system 120, and a backup server 110 comprising a data validator, the invention in not limited to such a configuration. For example, the data backup system 100 may include a plurality of backup servers (each including a data validator) that communicate with compliance system 120. In some implementations, the data backup system 100 may include a plurality of backup servers (each including a data validator) that communicate with a plurality of compliance systems 120 from different vendors, for example. In yet other implementations, the data validator may run on a separate system (separate from compliance system and backup server), wherein one or more compliance systems and one or more backup servers communicate with one another via the separate system. Other configurations may be also be implemented.

Figure 3:
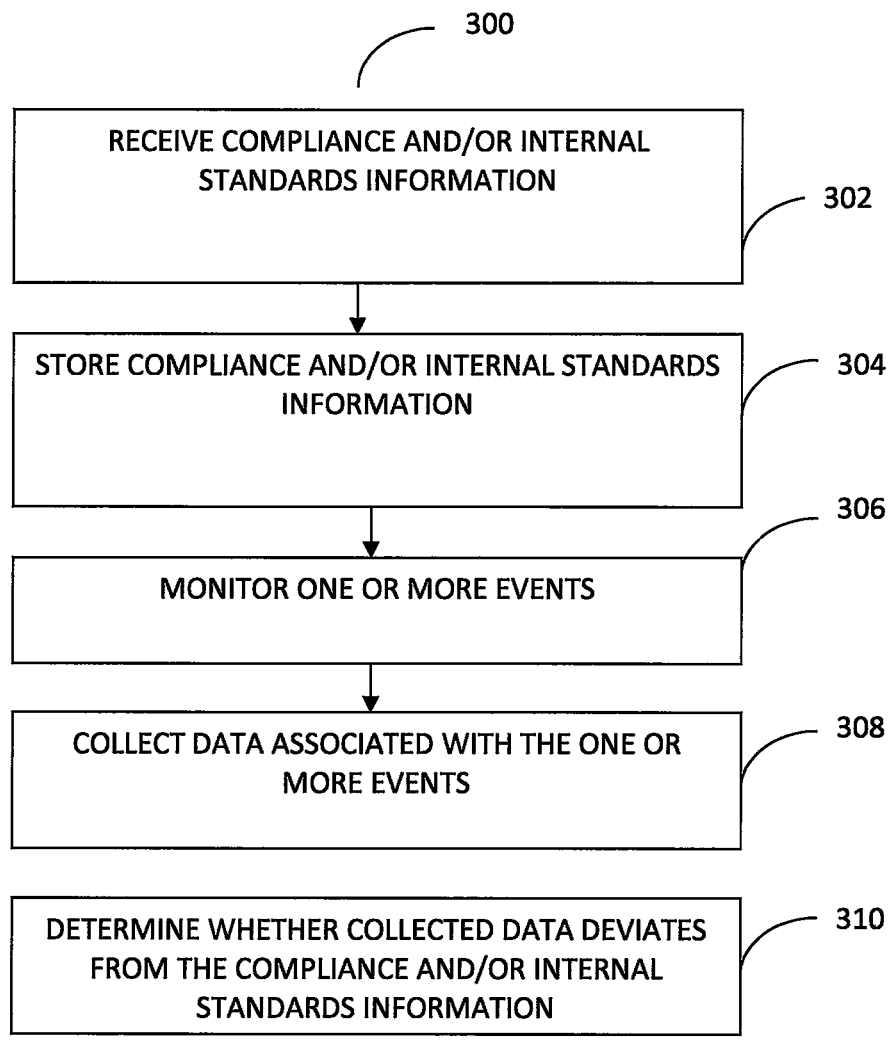
FIG. 3 is a flow diagram of a method of validating data, which can be practiced on the data backup system of FIG. 1.

FIG. 3 illustrates a flowchart of one embodiment of a method of performing data validation in a data backup system. The method may include example operations performed by a specially programmed processor or computing device, and can be practiced on the data backup system of FIG. 1 in some embodiments. In some implementations, the described operations may be accomplished using one or more of the modules/components described herein. In some implementations, various operations may be performed in different sequences. In other implementations, additional operations may be performed along with some or all of the operations shown in FIG. 3. In yet other implementations, one or more operations may be performed simultaneously. In yet other implementations, one or more operations may not be performed. Accordingly, the operations described are exemplary in nature and, as such, should not be viewed as limiting. It should be appreciated that the method can be practiced in a single pass, or in a loop.

Still referring to FIG. 3, in an operation 302, compliance and/or internal standards information may be received (from compliance system 120, for example). The received compliance and/or internal standards information may be stored, in an operation 304. One or more events or activities may be monitored, in an operation 306. Data associated with the monitored events or activities may be collected, in an operation 308. A determination regarding whether the collected data deviates from the compliance and/or internal standards information is made, in an operation 310. In some embodiments, the data collected in operation 308 is compared to the compliance or internal standards information of operation 320. Based on this comparison, it is determined whether the collected data deviates from the compliance standard. In response to a determination that the collected data does deviate from the compliance and/or internal standards information, feedback may be provided to the user in the form of a notification, warning, alert or other message. In some implementations, the feedback and/or associated data may also be reported back to compliance system 120.

Figure 4:
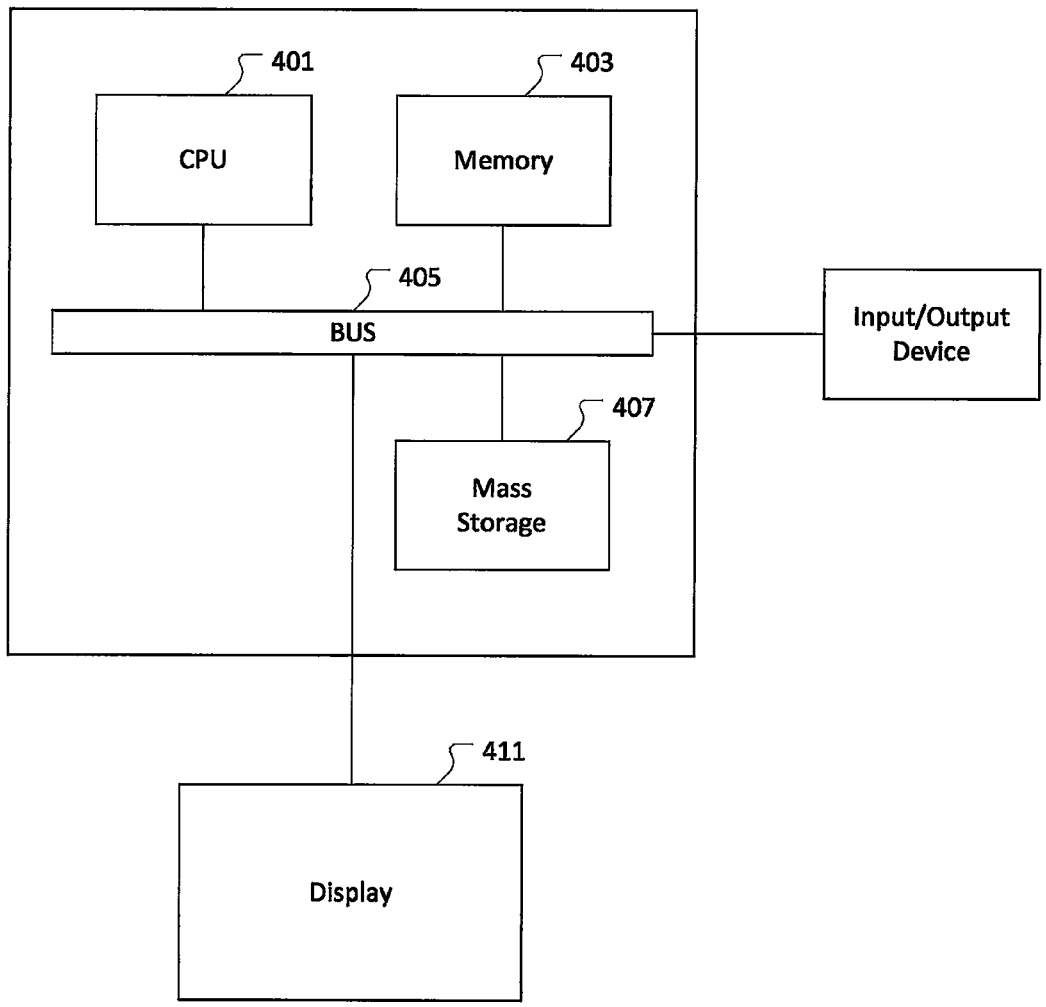
FIG. 4 is an illustration showing an exemplary computing device which can implement various embodiments of the invention.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality of the backup server in accordance with some embodiments. The computing device includes a central processing unit (CPU) 401, which is coupled through a bus 405 to a memory 403, and mass storage device 407. Mass storage device 407 represents a persistent data storage device such as a floppy disc drive or a fixed disc drive, which may be local or remote in some embodiments. Memory 403 may include read only memory, random access memory, etc. Applications resident on the computing device may be stored on or accessed via a computer readable medium such as memory 403 or mass storage device 407 in some embodiments. Applications may also be in the form of modulated electronic signals modulated accessed via a network modem or other network interface of the computing device. It should be appreciated that CPU 401 may be embodied in a general-purpose processor, a special purpose processor, or a specially programmed logic device in some embodiments.

Display 411 is in communication with CPU 401, memory 403, and mass storage device 407, through bus 405. Display 411 is configured to display any visualization tools or reports associated with the system described herein. Input/output device 409 is coupled to bus 405 in order to communicate information in command selections to CPU 401. It should be appreciated that data to and from external devices may be communicated through the input/output device 409. CPU 401 can be defined to execute the functionality described herein to enable the functionality described with reference to FIGS. 1-3. The code embodying this functionality may be stored within memory 403 or mass storage device 407 for execution by a processor such as CPU 401 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also. In addition, the embodiments concerning compliance validation and verification presented herein may be integrated with any backup software or solution commercially available.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for determining policy compliance in backup and compliance systems, comprising:
   receiving, at a data backup system, from a compliance system, compliance and internal standards information relating to policies of the compliance system;
   storing the received compliance and internal standards information in the data backup system;
   monitoring one or more events comprising a policy creation event relating to internal policies of the data backup system;
   collecting data associated with the monitored one or more events comprising the policy creation event wherein the collected data comprises an indication regarding whether duplication for a policy resulting from the policy creation event has been enabled; and
   determining, from the collected data and the compliance and internal standards information, whether the internal policies of the data backup system are in compliance with the policies of the compliance system, including determining whether collected data associated with the policy creation event, indicating whether duplication for the policy has been enabled, deviates from a desired retention period for data, according to the policies of the compliance system.

2. The method of claim 1, wherein the compliance and internal standards information comprises one or more of a desired retention period for policies, a desired RTO (recovery time objective), and a desired RPO (recovery point objective).

3. The method of claim 1, wherein the compliance and internal standards information comprises one or more of a naming standard, a privacy standard and an encryption standard.

4. The method of claim 1, further comprising:
   collecting data associated with a further policy creation event, wherein the collected data comprises backup parameters for performing backup based on a policy resulting from the further policy creation event; and
   wherein determining whether the internal policies of the data backup system are in compliance with the policies of the compliance system further comprises:
      determining whether the collected data associated with the further policy creation event deviates from a desired RTO (recovery time objective) or a desired RPO (recovery point objective), according to the policies of the compliance system.

5. The method of claim 1, further comprising:
   collecting data associated with a further policy creation event, wherein the collected data comprises a format in which a policy being created internal to the data backup system is named; and
   wherein determining whether the internal policies of the data backup system are in compliance with the policies of the compliance system further comprises:
      determining whether format of the policy being created associated with the further policy creation event deviates from a policy naming standard according to the policies of the compliance system.

6. The method of claim 1, further comprising:
   collecting data associated with a further policy creation event, wherein the collected data comprises an indication regarding whether encryption has been enabled for a policy resulting from the further policy creation event; and
   wherein determining whether the internal policies of the data backup system are in compliance with the policies of the compliance system further comprises:
      determining whether the collected data associated with the further policy creation event, indicating whether encryption has been enabled for the policy, deviates from an encryption standard according to the policies of the compliance system.

7. A data backup system, comprising:
   a backup server coupled to a memory, the memory configured to store compliance and internal standards information, relating to policies of a compliance system, received from the compliance system;
   the backup server comprising a data validator, the data validator having instructions configured to be executed by a processor to cause the processor to:
      monitor one or more events comprising a policy creation event relating to internal policies of the data backup system;

collect data associated with the monitored one or more events comprising the policy creation event, wherein the collected data comprises backup parameters for performing backup based on a policy resulting from the policy creation event; and determine, from comparison of the collected data and the compliance and internal standards information whether the internal policies of the data backup system are in compliance with the policies of the compliance system and whether the collected data associated with the policy creation event deviates from a desired RTO (recovery time objective) or a desired RPO (recovery point objective), according to the policies of the compliance system.

8. The data backup system of claim 7, wherein the compliance and internal standards information comprises one or more of a desired retention period for policies, the desired RTO, and the desired RPO.

9. The data backup system of claim 7, wherein the compliance and internal standards information comprises one or more of a policy naming standard, a privacy standard and an encryption standard.

10. The data backup system of claim 7, wherein the data validator is further configured to:

collect data associated with a further policy creation event, wherein the collected data comprises an indication regarding whether duplication for a policy resulting from the further policy creation event has been enabled; and determine whether the collected data associated with the further policy creation event, indicating whether duplication for the policy has been enabled, deviates from a desired retention period for data, according to the policies of the compliance system.

11. The data backup system of claim 7, wherein the data validator is further configured to:

collect data associated with a further policy creation event, wherein the collected data comprises a format in which a policy being created internal to the data backup system is named; and determine whether format of the policy being created associated with the further policy creation event deviates from a policy naming standard according to the policies of the compliance system.

12. The data backup system of claim 7, wherein the data validator is further configured to:

collect data associated with a further policy creation event, wherein the collected data comprises an indication regarding whether encryption has been enabled for a policy resulting from the further policy creation event; and determine whether the collected data associated with the further policy creation event, indicating whether encryption has been enabled for the policy, deviates from an encryption standard according to the policies of the compliance system.

13. A nontransient, tangible, computer-readable media having instructions thereupon which, when executed by a processor of a data backup system, cause the processor to:

receive, from a compliance system, compliance and internal standards information relating to policies of the compliance system;

store the received compliance and internal standards information;

monitor one or more events comprising a policy creation event relating to internal policies of the data backup system;

collect data associated with the monitored one or more events comprising the policy creation event, wherein the collected data comprises an indication regarding whether encryption has been enabled for a policy resulting from the policy creation event; and determine, based on the collected data and the compliance and internal standards information, whether the internal policies of the data backup system are in compliance with the policies of the compliance system and whether the collected data associated with the policy creation event, indicating whether encryption has been enabled for the policy, deviates from an encryption standard according to the policies of the compliance system.

14. The computer-readable media of claim 13, wherein the compliance and internal standards information comprises one or more of a desired retention period for policies, a desired RTO (recovery time objective), a desired RPO (recovery point objective), a policy naming standard, a privacy standard and an encryption standard.

15. The computer-readable media of claim 13, the instructions further causing the processor to:

collect data associated with a further policy creation event, wherein the collected data comprises an indication regarding whether duplication for a policy resulting from the further policy creation event has been enabled; and determine whether the collected data associated with the further policy creation event, indicating whether duplication for the policy has been enabled, deviates from a desired retention period for data, according to the policies of the compliance system.

16. The computer-readable media of claim 13, the instructions further causing the processor to:

collect data associated with a further policy creation event, wherein the collected data comprises backup parameters for performing backup based on a policy resulting from the further policy creation event; and determine whether the collected data associated with the further policy creation event deviates from a desired RTO (recovery time objective), or a desired RPO (recovery point objective), according to the policies of the compliance system.

17. The computer-readable media of claim 13, the instructions further causing the processor to:

collect data associated with a further policy creation event, wherein the collected data comprises a format in which a policy being created internal to the data backup system is named; and determine whether format of the policy being created associated with the further policy creation event deviates from a policy naming standard according to the policies of the compliance system.

* * * * *